May 18, 1965  C. E. ANDERSON  3,184,215

PLUG VALVE

Original Filed Nov. 12, 1959

Clifford E. Anderson
INVENTOR.

BY Russell E. Schloff

ATTORNEY

United States Patent Office 3,184,215
Patented May 18, 1965

---

3,184,215
PLUG VALVE
Clifford E. Anderson, Houston, Tex., assignor to ACF Industries, Incorporated, New York, N.Y., a corporation of New Jersey
Original application Nov. 12, 1959, Ser. No. 852,577, now Patent No. 3,108,779, dated Oct. 29, 1963. Divided and this application Dec. 11, 1961, Ser. No. 158,279
1 Claim. (Cl. 251—309)

This invention relates generally to valves and more particularly to a sealing means assembly therefor. This application is a divisional application of my copending application Serial Number 852,577 filed November 12, 1959, now Patent Number 3,108,779, which in turn is a continuation in part of my then copending application Serial Number 633,164 filed January 8, 1957, now abandoned.

It is an object of the present invention to provide a plug valve having substantially rectangular ports wherein a novel sleeve is interposed between the plug and the plug chamber.

Another object is to provide a plug valve having substantially rectangular ports provided with a sleeve interposed between the plug and the plug chamber wherein the sleeve is provided with substantially rectangular passageways defined by outturned side lips formed integral with the sleeve, and which outturned side lips are adapted to project into and overlappingly engage with the side edges of the ports just beyond said plug chamber.

A further object is to provide a sleeve assembly for a plug valve, which assembly is economical to manufacture, install and maintain and which may be removed and replaced with a minimum of time and expense.

In order to accomplish the above enumerated objects, the plug valve of the present invention is provided with substantially rectangular inlet and outlet ports each having top, bottom and side edges, and a plug chamber formed of a bore normal to said ports. A sleeve is positioned in the plug chamber. The sleeve has substantially rectangular inlet and outlet passageways each including top and bottom and side edges. The side edges are defined by outturned lips which project beyond the plug chamber to terminate interiorly of the side edges of corresponding ports in the valve body. By such construction the sleeve is securely anchored in the valve body and can be easily replaced.

A preferred embodiment of the invention has been chosen for the purpose of illustration and description and is shown in the acompanying drawings forming a part of the specification, wherein.

Figure 2:
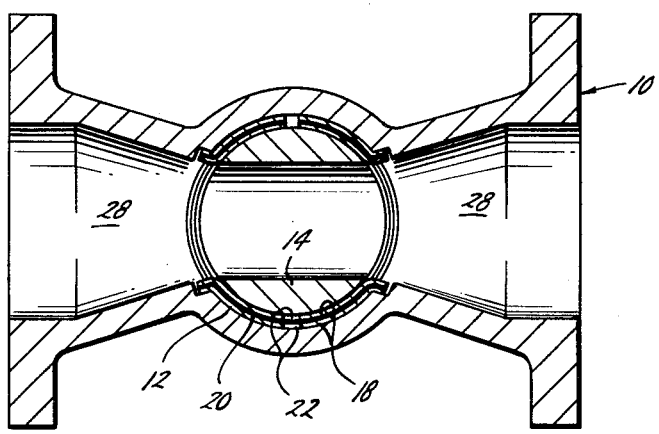
FIG. 2 is a horizontal cross section of the valve shown in FIG. 1.
Figure 1:
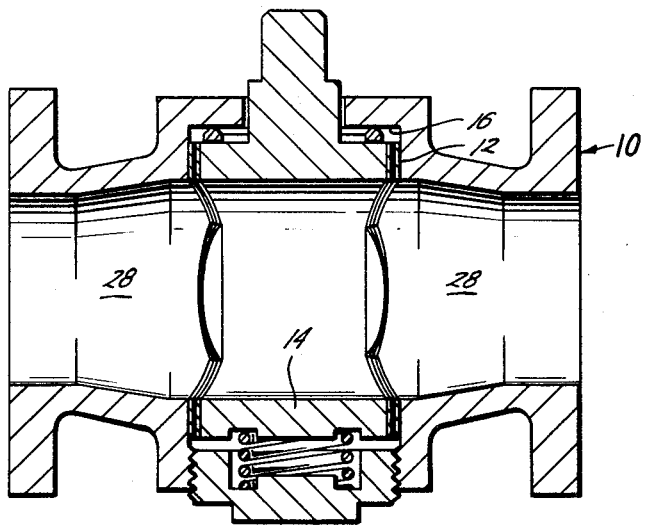
FIG. 1 is a vertical cross section of a cylindrical plug valve having a resilient liner of the present invention.
Figure 3:
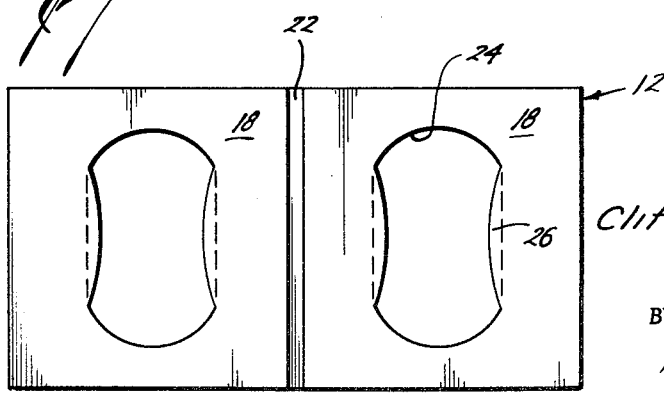
FIG. 3 is a layout of the liner incorporated in the valve shown in FIG. 1.

Referring to FIGS. 1 and 2, a cylindrical plug valve 10 is shown incorporating a liner 12 formed in accordance with the present invention. The liner 12 surrounds the plug 14 in the plug chamber 16, which is of sufficient size to accommodate both the plug 14 and the liner 12. The liner 12, which is shown as a layout in FIG. 3, is comprised of two layers 18—18 of very thin resilient material bonded to a central load carrying member 20 which may be sheet steel. If desired, each layer 18 of resilient material may be formed of two pieces with a space 22 therebetween. Such construction relieves the buildup of sheer stress produced during rolling by the increase of either tensile or compressive stress which would be directly proportional to the length of interrupted material, thereby the tendency for the failure of the bond at the ends of the liner is substantially reduced. The liner 12 is provided with openings 24—24 which are so formed as to provide material for tangs 26—26. After the liner has been fabricated in the form shown in the FIG. 3, it is then formed into a cylinder and inserted into the plug chamber 16. The tangs 26—26 are bent outwardly and aid in orienting the liner in the plug chamber maintaining the openings 24—24 in registry with the flow passage 28—28 of the valve. As shown in FIG. 2, the ends of the liner do not have to make contact and there may be a slight space between the ends. The valve should be so designed that the plug 14 may, in closed position, move over against the downstream side of the liner upon the application of line pressure thereby permitting the plug to come into intimate contact with the resilient sealing surface. The resilient sealing surface will give somewhat permitting any minor irregularities in the surface of the plug area to be confined by sealing material thereby tightly sealing the valve.

As various changes may be made in the form, construction, and arrangements of the parts herein without departing from the spirit and scope of the invention and without sacrificing any of its advantages, it is to be understood that all matter herein is to be interpreted as illustrative and not in a limiting sense.

What is claimed is:

In a plug valve, a valve body having substantially rectangular inlet and outlet ports each having top, bottom and side edges and a bore normal to said ports, a sleeve in said bore, said sleeve having substantially rectangular inlet and outlet passageways each including top, bottom and side edges wherein only said side edges are defined by outturned lips which project beyond said bore and terminate interiorly of only the side edges of corresponding ports in said valve body.

No references cited.

M. CARY NELSON, *Primary Examiner.*
MARTIN P. SCHWADRON, *Examiner.*